United States Patent
Billsberry et al.

(10) Patent No.: US 10,557,934 B1
(45) Date of Patent: Feb. 11, 2020

(54) ALTIMETER APPARATUS FOR EXTERNAL FUSELAGE MOUNTING

(71) Applicant: Rockwell Collins, Inc., Cedar Rapids, IA (US)

(72) Inventors: Mark A. Billsberry, Indialantic, FL (US); Shawn M. Mason, Satellite Beach, FL (US); David A. Wright, Melbourne, FL (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 204 days.

(21) Appl. No.: 15/639,637

(22) Filed: Jun. 30, 2017

(51) Int. Cl.
| | |
|---|---|
| *G01S 13/88* | (2006.01) |
| *H01Q 1/42* | (2006.01) |
| *G01S 13/32* | (2006.01) |
| *H01Q 1/28* | (2006.01) |
| *H01Q 9/04* | (2006.01) |

(52) U.S. Cl.
CPC .......... *G01S 13/882* (2013.01); *G01S 13/32* (2013.01); *H01Q 1/28* (2013.01); *H01Q 1/42* (2013.01); *H01Q 9/0407* (2013.01)

(58) Field of Classification Search
CPC ............................... G01S 13/882; G01S 13/32
USPC ................................................ 342/120–122
See application file for complete search history.

(56) References Cited

U.S. PATENT DOCUMENTS

| | | | | |
|---|---|---|---|---|
| 4,945,360 | A  * | 7/1990  | Trummer | G01S 7/35 342/122 |
| 6,335,699 | B1 * | 1/2002  | Honma   | H01Q 1/42 342/13 |
| 7,239,266 | B2 * | 7/2007  | Vacanti | G01S 7/032 342/103 |
| 7,463,710 | B2 * | 12/2008 | Walsh   | H03L 7/1976 327/156 |
| 8,044,842 | B2 * | 10/2011 | Thomas  | G01S 13/882 342/120 |
| 9,081,094 | B2   | 7/2015  | Holt    | |
| 2011/0221626 | A1 * | 9/2011 | Hill | B64C 7/00 342/30 |
| 2013/0214963 | A1 * | 8/2013 | Vacanti | G01S 7/038 342/120 |
| 2013/0214964 | A1 * | 8/2013 | Holt | G01S 13/882 342/120 |

\* cited by examiner

*Primary Examiner* — Marcus E Windrich
(74) *Attorney, Agent, or Firm* — Donna P. Suchy; Daniel M. Barbieri

(57) ABSTRACT

An altimeter apparatus for external fuselage mounting for an aircraft includes an altimeter circuit and a chassis. The altimeter circuit is coupled to an antenna system. The altimeter circuit is configured to generate a first signal and transmit the first signal via the antenna system, receive a second signal via the antenna system, wherein the second signal is a reflected version of the first signal, and determine an altitude based on the first and second signals. The chassis is configured to contain the altimeter circuit and the antenna system, wherein the chassis is connected to a fuselage of the aircraft and is located outside of the aircraft.

20 Claims, 10 Drawing Sheets

ALTIMETER APPARATUS FOR EXTERNAL FUSELAGE MOUNTING

BACKGROUND

Embodiments of the inventive concepts disclosed herein relate generally to the field of altimetry. More particularly, embodiments of the inventive concepts disclosed herein relate to systems and methods for low range altimeters (LRA) for aircraft.

Altimetry is the technique by which altitude is measured. An altimeter is an instrument that measures altitude. Altimeters are frequently used in avionics where the altitude of an aircraft such as a commercial jet, a helicopter, and/or any other vehicle must be known. In many cases, altimeters can be used in aircraft to notify a pilot of the altitude of an aircraft or to alert a warning system of the current altitude of the aircraft. Altimeters may be sonic altimeters, pressure altimeters, or radar altimeters. A radar altimeter, also known as a low range altimeter (LRA), uses radio waves to determine an altitude above terrain for an aircraft.

SUMMARY

In one aspect, the inventive concepts disclosed herein are directed to an altimeter apparatus for external fuselage mounting for an aircraft. The altimeter apparatus for the aircraft includes an altimeter circuit and a chassis. The altimeter circuit is coupled to an antenna system. The altimeter circuit is configured to generate a first signal and transmit the first signal via the antenna system, receive a second signal via the antenna system, wherein the second signal is a reflected version of the first signal, and determine an altitude based on the first and second signals. The chassis is configured to contain the altimeter circuit and the antenna system. The chassis is connected to a fuselage of the aircraft and is located outside of the aircraft.

In a further aspect, the inventive concepts disclosed herein are directed to an altimeter system for external fuselage mounting for an aircraft. The altimeter system includes an altimeter circuit, a chassis, and a radome cover. The altimeter circuit is coupled to a first antenna and a second antenna. The altimeter circuit is configured to generate, via a fractional-N synthesizer, a first signal and transmit the first signal via the first antenna, receive a second signal via the second antenna, the second signal being a reflected version of the first signal, and determine an altitude based on the first signal and the second signal. The chassis is configured to contain the altimeter circuit, the first antenna, and the second antenna. The chassis is connected to a mounting plate of the aircraft and is located outside of the aircraft. The radome cover is connected to the chassis, the radome cover structured to enclose the altimeter circuit, the first antenna, and the second antenna.

In a further aspect, the inventive concepts disclosed herein are directed to a low range altimeter (LRA) apparatus for external fuselage mounting for an aircraft. The LRA apparatus includes an altimeter circuit coupled to a first antenna and a second antenna and a chassis. The altimeter circuit is configured to generate a first signal and transmit the first signal via the first antenna, receive a second signal via the second antenna, wherein the second signal is a reflected version of the first signal, and determine an altitude based on the first signal and the second signal. The chassis is configured to contain the altimeter circuit, the first antenna, and the second antenna. The chassis is connected to a fuselage of the aircraft and is located outside of the aircraft. The chassis is connected to a mounting plate that is connected to a fuselage of the aircraft. The first o-ring forms a pressure seal between the chassis and the mounting plate and a second o-ring forms a pressure seal between the mounting plate and the fuselage of the aircraft.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
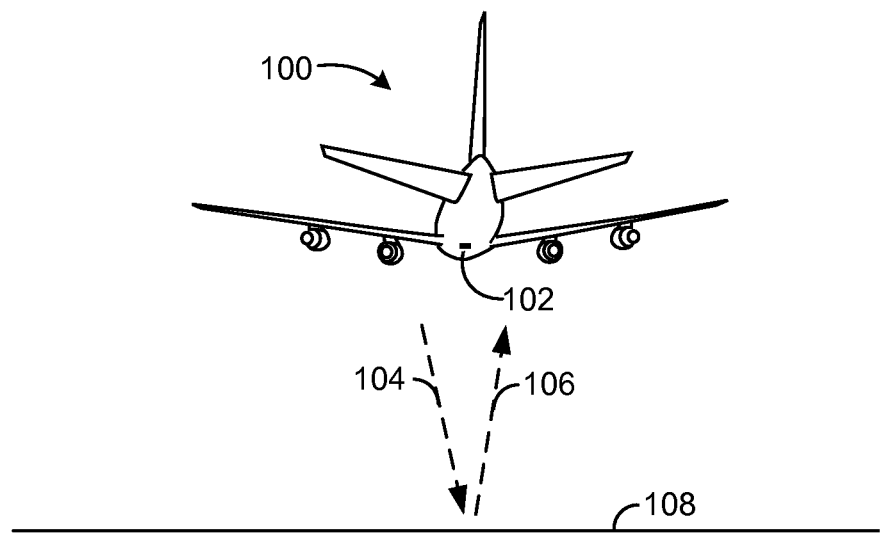
FIG. 1 is a perspective view schematic drawing of an aircraft with a smart antenna according to exemplary aspects of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the figures, systems and methods for a low range altimeter (LRA) apparatus for external fuselage mounting are described with respect to various aspects of the inventive concepts. A low range altimeter (LRA), otherwise referred to as a low range radar altimeter (LRRA), is a device that is used in an aircraft to determine the altitude of the aircraft, more particularly, the distance between the ground and the LRA. The LRA discussed herein can be used in commercial aircraft, military aircraft, spacecraft, and/or any other vehicle, system, or apparatus where the distance between a surface (e.g., the ground) and the LRA needs to be determined. An LRA can generate a first signal and transmit the first signal via a first antenna. The first signal may be reflected by terrain under the aircraft and can be received by a second antenna. The reflected signal will be a delayed version of the transmitted signal. For this reason, the frequency of the received signal may trail the frequency of the transmitted signal. Circuitry of the LRA (e.g., a mixer) can be configured to determine the difference in frequency between the transmitted single and the received signal. Based on the difference in frequency, the altitude of the aircraft can be determined.

An LRA apparatus includes a fractional-N synthesizer in some embodiments. By using a fractional-N synthesizer, the total size of the active electronics of the LRA apparatus can be greatly reduced. For example, the fractional-n frequency synthesizer, ADF4158, has dimensions of 4.00 mm by 4.00 mm by 0.75 mm. Since the use of the fractional-N frequency synthesizer can greatly reduce the size of active electronics of the LRA, this can allow for the LRA apparatus to be located outside of an aircraft (e.g., on the outside of the fuselage) in some embodiments.

A smart antenna LRA apparatus allows for a technician to directly access, fix, replace, or otherwise modify the smart antenna in some embodiments. In some embodiments, the smart antenna can be coupled to a mounting plate. The mounting plate is attached to the fuselage and creates a pressure seal between the mounting plate and the fuselage in some embodiments. A technician can easily attach or remove the smart antenna to/from the mounting plate without breaking the pressure seal in some embodiments. This may allow for quick and efficient installation, modification, or replacement of the smart antenna LRA described herein. Many altimeter antenna systems may be bonded to an aircraft via a sealer. This sealer may take time to cure, twenty-four hours for some sealers. Further, the aircraft may require pressure testing after the sealer cures. By using a smart antenna as described herein, the wait time for a sealer to cure is not necessary when accessing, fixing, or replacing the smart antenna since replacing the smart antenna may not require the application of a sealer. For this reason, pressure testing may not be necessary for an aircraft after accessing, fixing, or replacing the smart antenna.

Referring to FIG. 1, an aircraft 100 including a smart antenna 102 is shown, according to an exemplary embodiment. The smart antenna 102 may be an apparatus that includes circuits and circuit components in addition to antennas together in a single enclosure. Smart antenna 102 is a radar altimeter, e.g., a LRA, that is configured to determine the altitude of aircraft 100 in some embodiments. Smart antenna 102 is used in avionics or in other fields where the distance between two objects needs to be determined in some embodiments. Smart antenna 102 is shown to transmit signal 104 and receive signal 106. Smart antenna 102 can be configured to use both transmitted signal 104 and received signal 106 to determine the altitude of aircraft 100. Aircraft 100 of FIG. 1 is shown to be an airliner. However, aircraft 100 may be any kind of commercial aircraft, military aircraft, helicopter, unmanned aerial vehicle (UAV), spacecraft, and/or any other kind of vehicle, manned or unmanned. In some embodiments, aircraft 100 may include a plurality of altimeters (e.g., smart antenna 102). For example, aircraft 100 might include three separate smart antennas 102. The plurality of smart antennas may provide altitude data to a central system that can cross-check the altitude data.

Transmitted signal 104 and received signal 106 can be the same signal, i.e., a signal transmitted by smart antenna 102 and reflected off of terrain 108. Received signal 106 can be a delayed version of transmitted signal 104. Received signal 106 may be a combination of signals with different delays and amplitudes. Signals 104 and 106 may be frequency-modulated continuous-wave (FMCW) signals with frequencies in the super high frequency (SHF) band (e.g., frequencies between 3 GHz and 30 GHz). Signals 104 and 106 and may have frequencies between 4225 MHz and 4375 MHz.

Figure 2:
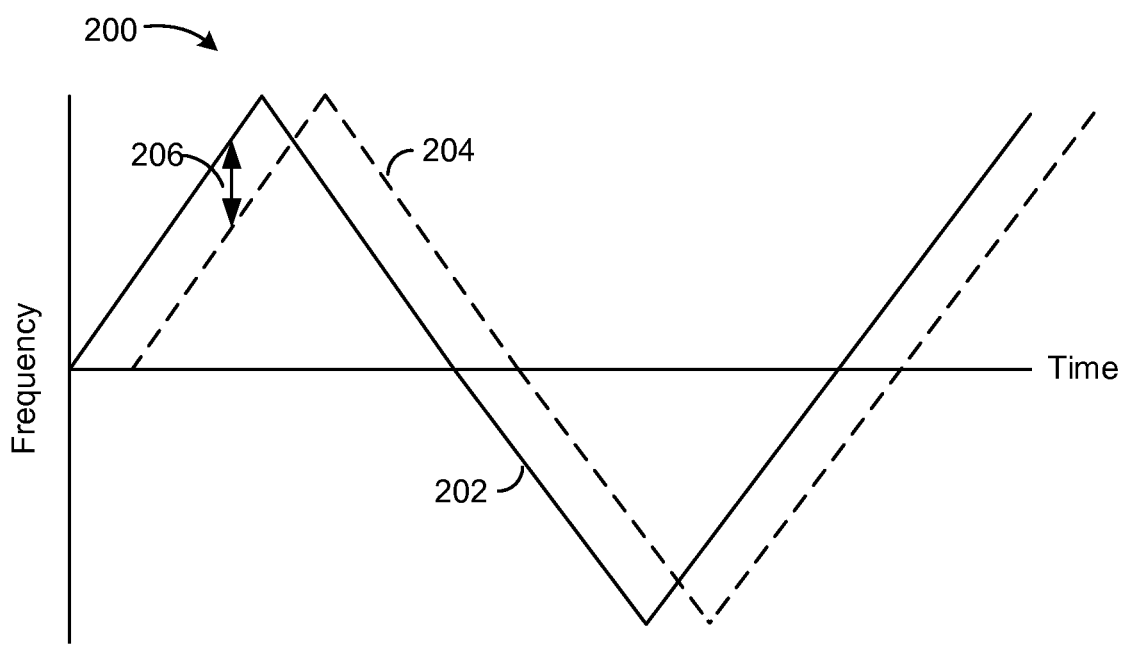
FIG. 2 is a graph of the frequency of transmitted and received signals of the smart antenna of FIG. 1, according to exemplary aspects of the inventive concepts disclosed herein.

With reference to FIG. 2, a graph 200 of the frequencies of transmitted signal 104 and received signal 106 is shown. In graph 200, the vertical axis, the y-axis, indicates frequency (e.g., frequencies between 4225 MHz and 4375 MHz) while the x-axis may indicate time. Line 202 may indicate the frequency of the transmitted signal, transmitted signal 104. The dashed line, line 204, may indicate the frequency of the received signal, received signal 106. As can be seen, there is a difference in frequency between line 202 and 204, difference 206. Difference 206 may be indicative of the altitude of aircraft 100. Smart antenna 102 can be configured to determine the difference in frequency between the two signals, transmitted signal 104 and received signal 106, to determine the altitude of aircraft 100.

Figure 3:
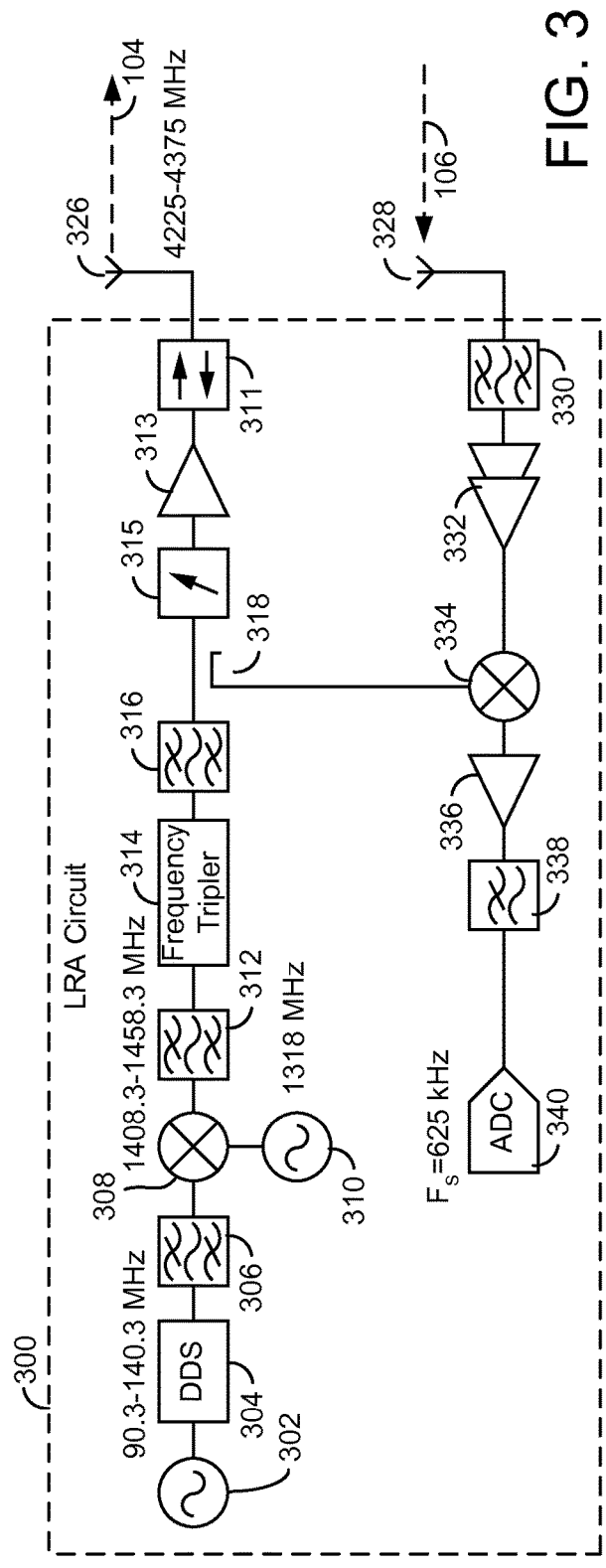
FIG. 3 is a block diagram of an altimeter circuit for the smart antenna of FIG. 1 according to exemplary aspects of the inventive concepts disclosed herein.

With reference to FIG. 3, LRA circuit 300 is shown to generate and transmit a FMCW signal and receive a reflection of the transmitted signal. LRA circuit 300 may include various processing circuits, RF coupler circuits, RF mixer circuits, RF amplifier circuits, RF antennas, voltage controlled oscillators (VCOs), frequency tripler circuits, direct digital synthesizers (DDSs), and/or any other circuit (e.g., application specific integrated circuit (ASCI)), logic circuit, processor, microprocessor, and/or memory component (e.g., random access memory (RAM), read only memory (ROM), hard drive, or other non-transitory or transitory storage mediums). LRA circuit 300 may include one or more processing circuits (e.g., a processor and memory) that can be configured to perform some and/or all of the functions of LRA circuit 300.

LRA circuit 300 is shown to include VCO 302. VCO 302 can be configured to drive DDS 304. DDS 304 can be configured to generate a signal that varies linearly in frequency over time. In some embodiments, the signal ramps up and/or down between 90.3 MHz and 140.3 MHz. The signal generated by DDS 304 can be filtered by bandpass filter 306 and mixed with another signal (e.g., a 1318 MHz signal generated by VCO 310) by mixer 308. The result may be a signal with frequencies between 1408.3-1458.3 MHz. Bandpass filter 312 can be configured to filter the mixed signal.

LRA circuit 300 can triple the frequency of the filtered signal with frequency tripler 314. In some embodiments, LRA circuit 300 can be configured to filter the signal tripled in frequency with bandpass filter 316. This signal can be provided to mixer 334 via coupler 318 and can also be transmitted via antenna 326 as transmitted signal 104. Before being transmitted via antenna 326, the signal may pass through attenuator 315, amplifier 313, and isolator 311.

LRA circuit 300 is shown to receive a reflected version of transmitted signal 104, received signal 106, via antenna 328. Received signal 106 can be filtered by bandpass filter 330 and amplified by amplifiers 332. Filtered and amplified received signal 106 can be mixed with transmitted signal 104 via mixer 334 i.e., the single that coupler 318 provides mixer 334. The result may be a signal that includes frequency components that are the summation of frequencies of the transmitted signal 104 and received signal 106 and the difference in frequency of transmitted signal 104 and received signal 106. The mixed signal can then be amplified by amplifier 336 and then filtered by low pass filter 338. Low pass filter 338 can remove the frequency component that is the summation of the frequency of transmitted signal 104 and received signal 106 and leave the frequency component that is the difference of the frequencies of transmitted signal 104 and received signal 106.

Analog to digital converter (ADC) 340 can be configured to the sample the signal filtered by low pass filter 338. In some embodiments, ADC 340 samples the filtered signal at 625 kHz. Based on the sampled signal, LRA circuit 300 can be configured to determine the altitude based on the difference in frequency between the transmitted signal 104 and the received signal 106 as indicated by the frequency of the filtered signal. In some embodiments, a processing circuit or other component (e.g., altitude circuit 420) uses the sampled signal to determine the altitude of aircraft 100.

Figure 4:
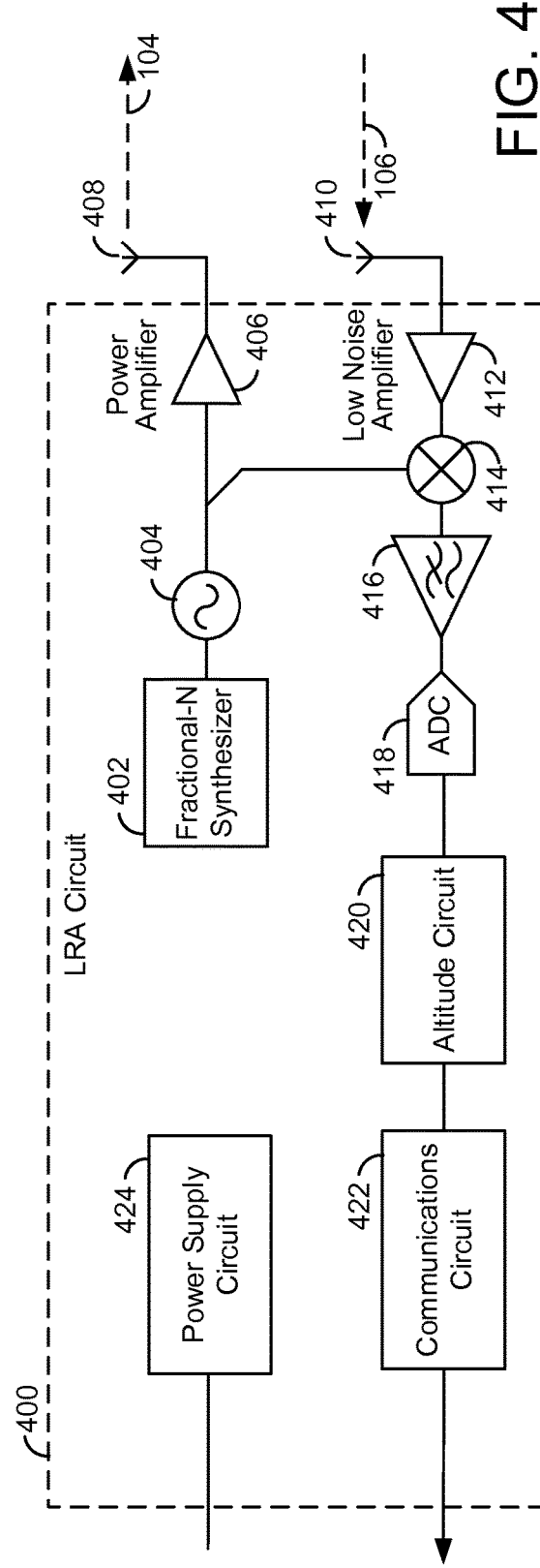
FIG. 4 is a block diagram of an altimeter circuit for the smart antenna of FIG. 1 that includes a fractional-N synthesizer according to exemplary aspects of the inventive concepts disclosed herein.

With reference to FIG. 4, LRA circuit 400 is shown to include fractional-N synthesizer 402. Fractional-N synthesizer 402 and/or VCO 404 can be configured to directly generate a FMCW signal between 4225-4375 MHz which can be amplified by amplifier 406 and transmitted via antenna 408. In some embodiments, fractional-N synthesizer 402 is an integer-N synthesizer or other indirect digital synthesizer. As can be seen, fractional-N synthesizer 402 can replace many of the components of LRA circuit 300 (e.g., VCO 302, DDS 304, bandpass filter 306, mixer 308, VCO 310, bandpass filter 312, frequency tripler 314, etc.).

LRA circuit 400 may include various processing circuits, RF coupler circuits, RF mixer circuits, RF amplifier circuits, RF antennas, voltage controlled oscillators (VCOs), and/or any other circuit (e.g., wired logic circuit, microprocessor, application specific integrated circuit (ASCI)), logic circuit, low power system on a chip (SoC), processor, microprocessor, and/or memory component (e.g., random access memory (RAM), read only memory (ROM), hard drive, or other non-transitory or transitory storage mediums.). LRA circuit 400 may include one or more processing circuits (e.g., a processor and memory) that can be configured to perform some and/or all of the functions of LRA circuit 400.

LRA circuit 400 may have a significantly smaller size than LRA circuit 300 due to the use of fractional-N synthesizer 402 in LRA circuit 400. Fractional-N synthesizer may be a fractional-N synthesizer such as an ADF4158 that has dimensions of 4.00 mm by 4.00 mm by 0.75 mm. This may allow for LRA circuit 400 to have a smaller footprint than LRA circuit 300. LRA circuit 300 can be configured to generate and transmit a FMCW signal. LRA circuit 400 can generate a FMCW wave via waveform fractional-N synthesizer 402, VCO 404, amplifier 406 and/or antenna 408.

Fractional-N synthesizer 402 may operate with and/or otherwise drive VCO 404. For example, VCO 404 may generate a signal at a particular frequency based on a voltage it receives from fractional-N synthesizer 402. In some embodiments, fractional-N synthesizer 402 drivers VCO 404 causing VCO 404 to generate a signal that ramps up and down in frequency (e.g., ramps between 4225-4375 MHz). In this regard, fractional-N synthesizer 402 may include VCO 404 and/or may be combined with VCO 404 as a single integrated circuit. The signal generated by fractional-N synthesizer 402 and/or VCO 404 may be applied as an input to mixer 414. In some embodiments, the signal generated by fractional-N synthesizer 402 may be provided to mixer 414 via a coupler (e.g., a coupler such as coupler 318). The signal may further be amplified by amplifier 406 which may be a power amplifier. Fractional-N synthesizer 402 and/or VCO 404 can be configured to generate a signal in the SHF band. Fractional-N synthesizer 402 and/or VCO 404 can be configured to ramp the frequency of the generated signal between first frequency and a second frequency. In some embodiments, the first and second frequencies are 4225 MHz and 4375 MHz. In some embodiments, the first and second frequencies are 4200 MHz and 4400 MHz.

Antenna 410 can be configured to receive signal 106, i.e., the reflected signal. Amplifier 412 (e.g., a low noise amplifier) can be configured to amplify received signal 106. Mixer 414 can be configured to mix the signal generated by fractional-N synthesizer 402 and/or VCO 404 and the signal received by antenna 410 and amplified by amplifier 412. The result of the multiplication of these signals may be a signal that includes both the sum and the difference of the frequencies of the two signals. Low pass filter amplifier 416 can be configured to filter the mixed signals and amplify the mixed signals, removing the sum of the frequencies and leaving the difference of the frequencies. ADC 418 can be configured to sample the filtered signal (e.g., sampled at 625 kHz) and provide the sampled signal to altitude circuit 420.

Antennas 408 and 410 shown in FIG. 4 may be part of an antenna system. The antenna system may include one or more antennas that are configured to transmit signals generated by LRA circuit 400. The antenna system may be connected to LRA circuit 400. Further, the antenna system can be configured to receive a reflected version of the transmitted signal (e.g., received signal 106) and provide the reflected version of the transmitted signal to LRA circuit 400.

In some embodiments, altitude circuit 420 is configured to determine the altitude of aircraft 100 based on the sampled signal. The samples determined by ADC 418 may be indicative of the difference in frequency between the transmitted signal 104 and the received signal 106. Based on the difference in frequency, altitude circuit 420 can be configured to determine the altitude of aircraft 100. In some embodiments, altitude circuit 420 determines the absolute difference of the frequencies and uses the absolute difference to determine the altitude of aircraft 100. The difference in frequency may be indicative of the altitude of aircraft 100 i.e., the altitude of aircraft 100 may be a function of the difference in frequency.

The altitude determined by altitude circuit 420 can be transmitted to other systems of aircraft 100. Communications circuit 422 can be configured to act as an interface between LRA circuit 400 and other systems of aircraft 100. For example, communications circuit 422 can be configured to communicate the altitude determined by altitude circuit 420 via a bus such as aeronautical radio Inc. (ARINC) 429. Communications circuit 422 can be configured, in some embodiments, to communicate the determined altitude via a controller area network (CAN) bus, UART, Ethernet, and/or any other type of communication protocol.

LRA circuit 400 is shown to include power supply circuit 424. Power supply circuit 424 can be configured to receive power from an external power source. In some embodiments, power supply circuit 424 can be configured to receive AC power and/or DC power from an external power source and power LRA circuit 400. In some embodiments, power supply circuit 424 can include one or more filters, power regulators, rectifiers, or other circuits necessary for powering LRA circuit 400. In various embodiments, LRA circuit 300 shown in FIG. 3 includes power supply circuit 424 for powering LRA circuit 300.

With reference to FIG. 3 and FIG. 4, antenna 326 and antenna 328 can be located separately from a circuit board that includes LRA circuit 300. This may be due to the size of LRA circuit 300, namely the size of DDS 304, bandpass filter 306, bandpass filter 312, frequency tripler 314, and/or bandpass filter 316. LRA circuit 400, however, can be located on a single circuit board along with antennas 408 and 410. Since LRA circuit 400 and antennas 408 and 410 can be located on a signal circuit board, the signal circuit board itself can be located outside an aircraft, i.e., connected to the outside of a fuselage of the aircraft.

Figure 7:
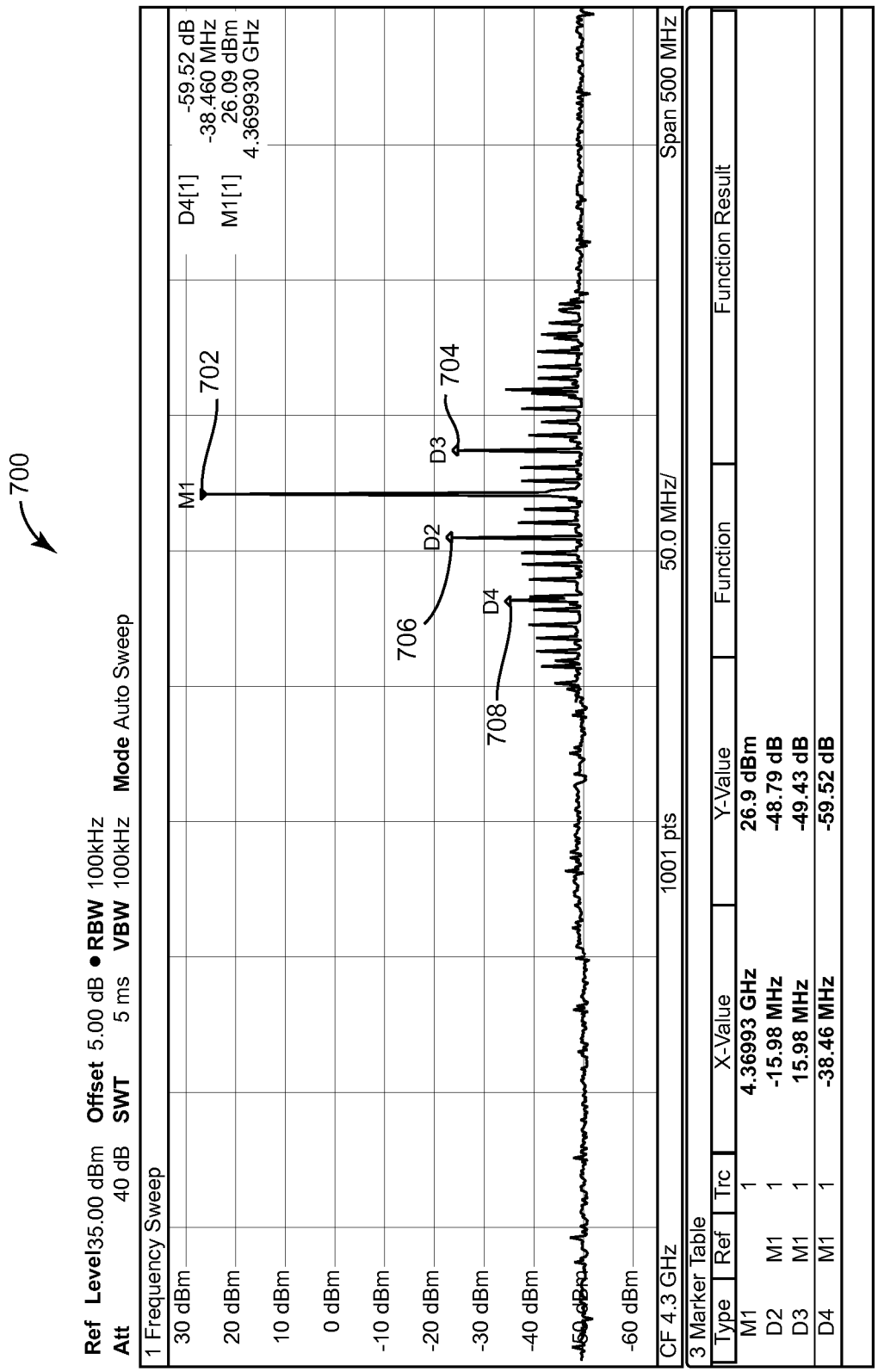
FIG. 7 is a graph illustrating the performance of the altimeter circuit of FIG. 3 according to exemplary aspects of the inventive concepts disclosed herein.

A DDS, e.g., DDS 304 shown in FIG. 3, may have a poor spurious response (see FIG. 7). An LRA circuit with a DDS may require aggressive filters (e.g., bandpass filter 306, bandpass filter 312, bandpass filter 316). This may significantly increase the size of an altimeter with a DDS (e.g., LRA circuitry 300). An altimeter with a fractional-N synthesizer, e.g., fractional-N synthesizer 402, may have a better spurious response than an altimeter with a DDS (see FIG. 8). Due to the improved spurious response, an altimeter with a fractional-N synthesizer may require less filters (e.g., LRA circuit 400) which may minimize the size and/or weight of an altimeter circuit that uses a fractional-N synthesizer (e.g., LRA circuit 400).

An example of LRA circuit 400 and antennas 408 and 410 being located outside of the fuselage of aircraft 100 is shown in FIGS. 6A-6G. When antennas are not located directly with active electronics, as is the case in FIG. 3, feeder cables may be necessary for connecting the active electronics to the antennas. In some embodiments, since the frequency of the transmitted and receives signals, signals 104 and 106, are high in frequency (i.e., between 4225 MHz and 4375 MHz), feeder cables of appropriate thickness are required. Further, the feeder cables may be sensitive regarding isolation, loss and delay and therefore, appropriate calibration may need to be done based on the lengths of the cables. Cable propagation delay may directly affect reported altitude. In some cases, the accuracy requirement for an altimeter is +/−3 ft. A smart antenna that minimizes cable propagation delay may report more accurate altitude and may not require precise calibration in order to meet accuracy requirements. With reference to FIG. 4, because the active electronics and the antennas 408 and 410 can be combined into one unit, smart antenna 102, there may be no feeder cables or there may be feeder cables of known length and orientation.

Figure 5:
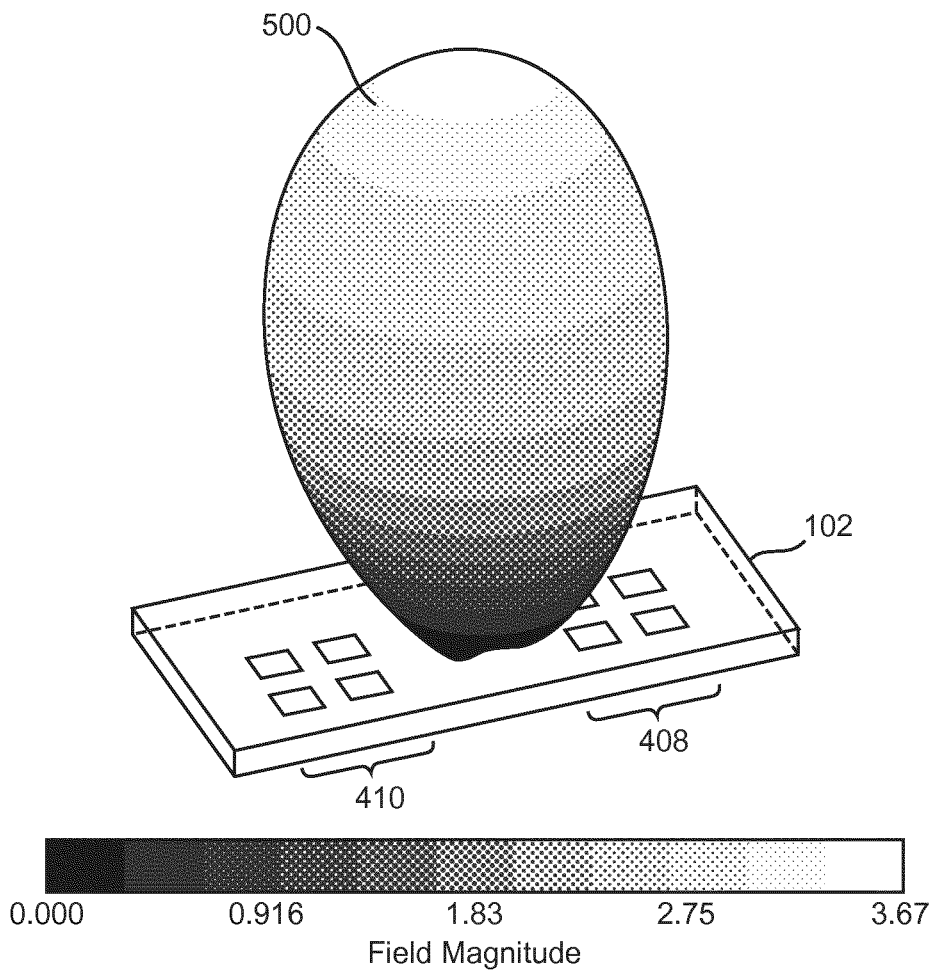
FIG. 5 is a perspective view schematic drawing of the smart antenna of FIG. 1 that includes two patch array antennas according to exemplary aspects of the inventive concepts disclosed herein.

With reference to FIG. 5, smart antenna 102 is shown in greater detail. Smart antenna 102 is shown to include antennas 408 and 410. Antenna 408 and 410 may both be patch antenna arrays. As shown in FIG. 5, antennas 408 and 410 may each be an array of four patch antennas. The field of magnitude for smart antenna 102 is illustrated by 500.

The magnitude 500 of FIG. 5 illustrates the magnitude of smart antenna 102. Aircraft that do not include a smart antenna e.g., smart antenna 102 may have altimeter system isolation issues since the isolation between antennas and altimeter circuitry need to be carefully considered. Further, many aircraft have two or three altimeter systems. This may result in a total of six antennas for three separate altimeter circuits, each of which require consideration when being positioned on the aircraft. When using smart antennas e.g., smart antenna 102, careful consideration of the circuits of each smart antenna and the antennas of the smart may not be relevant since each smart antenna includes both altimeter circuitry and altimeter antennas.

Smart antenna 102 can be mounted to the outside of the fuselage of aircraft 100 via a mounting plate. Smart antenna 102 may include LRA circuit 400 which may be mounted along with antennas 408 and 410 outside of aircraft 100. Smart antenna 102 may be a low profile device that includes LRA circuit 400 due to the small size of LRA circuit 400 that results from the use of fractional-N synthesizer 402. LRA circuit 300 may be too large to fit in smart antenna 102 due to the excess components of LRA circuit 300 (e.g., DDS 304, bandpass filter 306, VCO 310, mixer 308, etc.) that are replaced in LRA circuit 400 by fractional-N synthesizer 402.

Figure 6A:
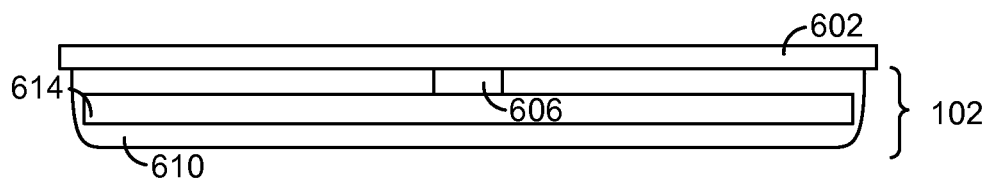
FIG. 6A is a side view schematic drawing of the smart antenna of FIG. 1 according to exemplary aspects of the inventive concepts disclosed herein.

With reference to FIG. 6A, smart antenna 102 is shown to be connected to mounting plate 602. Mounting plate 602 may be a mounting plate connected directly to the fuselage of aircraft 100 that allow for smart antenna 102 to be mounted or dismounted from aircraft 100 without breaking the aircraft pressure vessel. Mounting plate 602 may have a connector 606 that makes electrical connections between smart antenna 102 and aircraft 100. Smart antenna 102 can be broken into two sections, active electronics and antennas. Active electronics may be or include LRA circuit 400 while the antennas may include antennas 408 and 410. Mounting plate 602 may have a thickness of approximately 0.1", active electronics of smart antenna 102 (e.g., LRA circuit 400) may take up approximately 0.5", while antennas (e.g., antennas 410 and 408) may take up 0.2".

In some embodiments, the connections that need to be made between smart antenna 102 and aircraft 100 include one or more power connections (e.g., DC power) and/or communication connections (e.g., ARINC cable). The one or more power connections may power smart antenna 102 and the communication connections may allow smart antenna to communicate with aircraft 100 (e.g., communicate altitude data periodically and/or on demand). The power connections may be connected to power supply circuit 424 as described with reference to FIG. 4. Further, communication connections may connect to communication circuit 422 as described with reference to FIG. 4.

In some embodiments, the connector 606 is sealed via an o-ring. The connector 606 may be sealed in such a way that aircraft 100 is pressure sealed when smart antenna 102 is installed with mounting plate 602. In some embodiments, a connector is used for the hole which may be any kind of hermetic and/or airtight connector. Smart antenna 102 is shown to include circuit board 614. Circuit board 614 can include connector 606, LRA circuit 400, antenna 408, and/or antenna 410. Further, circuit board 614 may be enclosed by an enclosure, radome cover 610.

In systems that do not include a smart antenna, an enclosure of a LRA altimeter may need to be sealed via an adhesive to the fuselage of an aircraft. Some adhesives take up to 24 hours to cure. However, since smart antenna 102 includes all components of the LRA i.e., active electronics and antennas, smart antenna 102 can be connected to the fuselage via mounting plate 602 without breaking a pressure seal of aircraft 100 i.e., via connector 606.

Figure 6B:
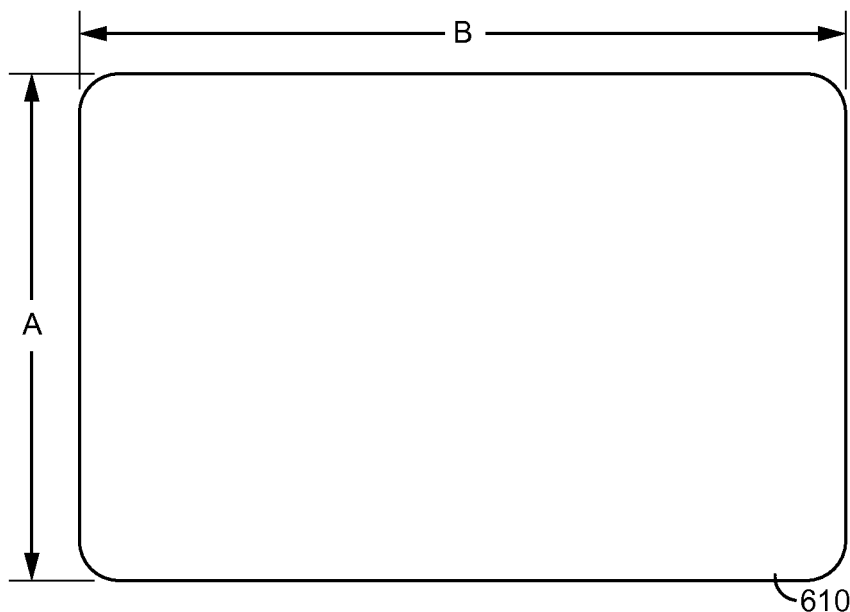
FIG. 6B is a top view schematic drawing of the smart antenna of FIG. 1 according to exemplary aspects of the inventive concepts disclosed herein.

With reference to FIG. 6B, a radome cover 610 is shown. Radome cover 610 may be a plastic enclosure that covers circuit board 614. Radome cover 610 can be connected to mounting plate 602 of FIG. 6A. In some embodiments, radome cover 610 is connected to mounting plate 602 via one or more screws, latches, or other forms of connection. Radome cover 610 may have dimensions of six inches by four inches e.g., the constant B shown in FIG. 6B may be six inches while the constant A shown in FIG. 6B may be four inches. However, various embodiments, of radome cover 610 may have different sizes.

Figure 6C:
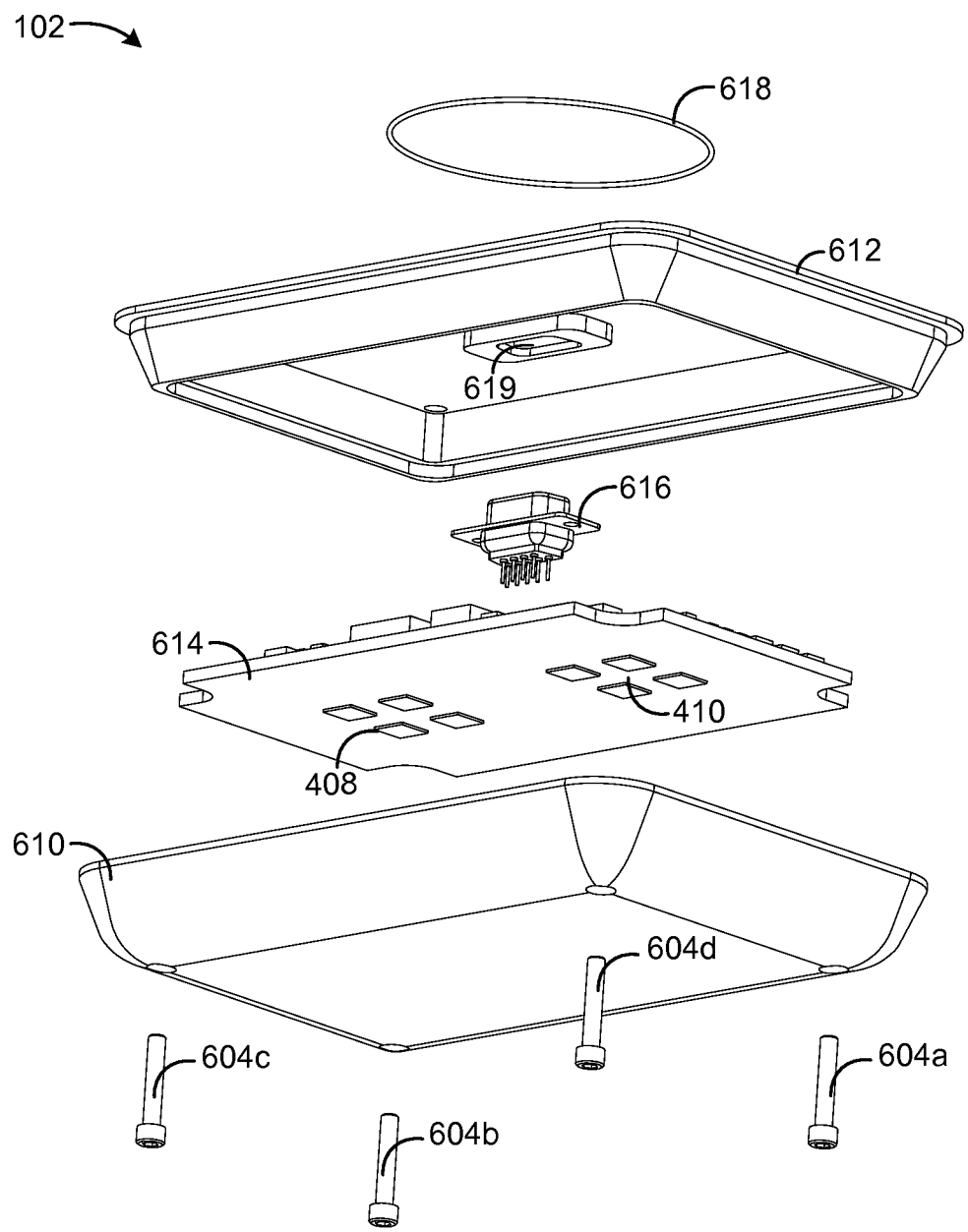
FIG. 6C is an exploded perspective view schematic drawing of the smart antenna of FIG. 1 from a side view illustrating the components of the smart antenna of FIG. 5 according to exemplary aspects of the inventive concepts disclosed herein.

With respect to FIG. 6C, smart antenna 102 is shown from an side view. Smart antenna 102 is shown to include radome cover 610 and chassis 612. Radome cover 610 and chassis 612 are shown to enclose circuit board 614. Radome cover 610 may be bonded to chassis 612. Smart antenna 102 can be connected to aircraft 100 via mounting hardware 604a-d (e.g., connected to fuselage 620). In embodiments where a mounting plate is used (e.g., mounting plate 602), mounting hardware 604a-d connects smart antenna 102 to mounting plate 602. Mounting hardware 604a-d may be one or more bolts, screws, or other connectors that hold radome cover 610 to chassis 612. Chassis 612 can be structured to hold circuit board 614. In some embodiments, circuit board 614 attaches (e.g., snaps in) to chassis 612 via a plurality of snaps. In some embodiments, a plurality of screws hold circuit board 614 to chassis 612.

Circuit board 614 may include LRA circuit 400. Circuit board 614 is further shown to include antennas 408 and 410. Antennas 410 and 408 may be on the top of circuit board 614 and may face terrain (e.g., terrain 108 described with further reference to FIG. 1). The active electronics of circuit board 614 (e.g., LRA circuit 400) may be located on the opposite side of circuit board 614. Male connector 616 is shown to be a component of circuit board 614. Male connector 616 may be exposed via an opening 619 of chassis 612. In this regard, circuit board 614 can be connected to various systems of aircraft 100 via male connector 616 (e.g., communication, power, etc.). O-ring 618 may be a plastic, rubber, or other type of material that forms a pressure seal. O-ring 618 may form a seal between chassis 612 and the external fuselage of an aircraft (e.g., aircraft 100).

Figure 6D:
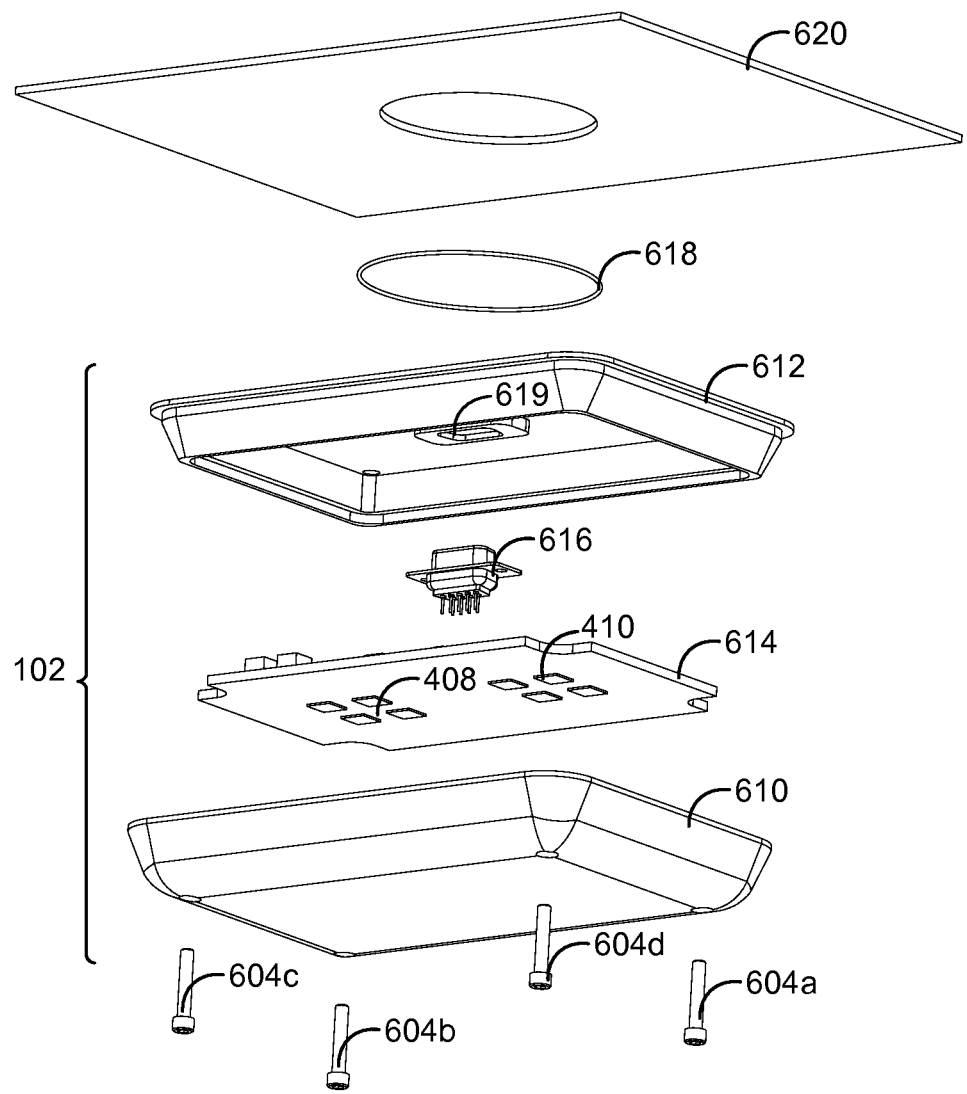
FIG. 6D is an exploded perspective view schematic drawing of the smart antenna of FIG. 1 connected to a fuselage of the aircraft of FIG. 1 according to exemplary aspects of the inventive concepts disclosed herein.

With reference to FIG. 6D, smart antenna 102 is shown to be connected to fuselage 620. Fuselage 620 may be an outside skin of a fuselage of aircraft 100 e.g., the outside skin of aircraft 100. Fuselage 620 may be on the bottom side of aircraft 100 such that antennas 410 and 408 are oriented to face the terrain below aircraft 100. As can be seen in FIG. 6D, o-ring 618 is shown to be located between chassis 612 and fuselage 620. O-ring 618 may be in direct contact with chassis 612 and fuselage 620 such that a pressure seal is created between smart antenna 102 and fuselage 620. In some embodiments, an adhesive is used between the outer layer of chassis 612 and fuselage 620 to create a pressure seal.

Figure 6E:
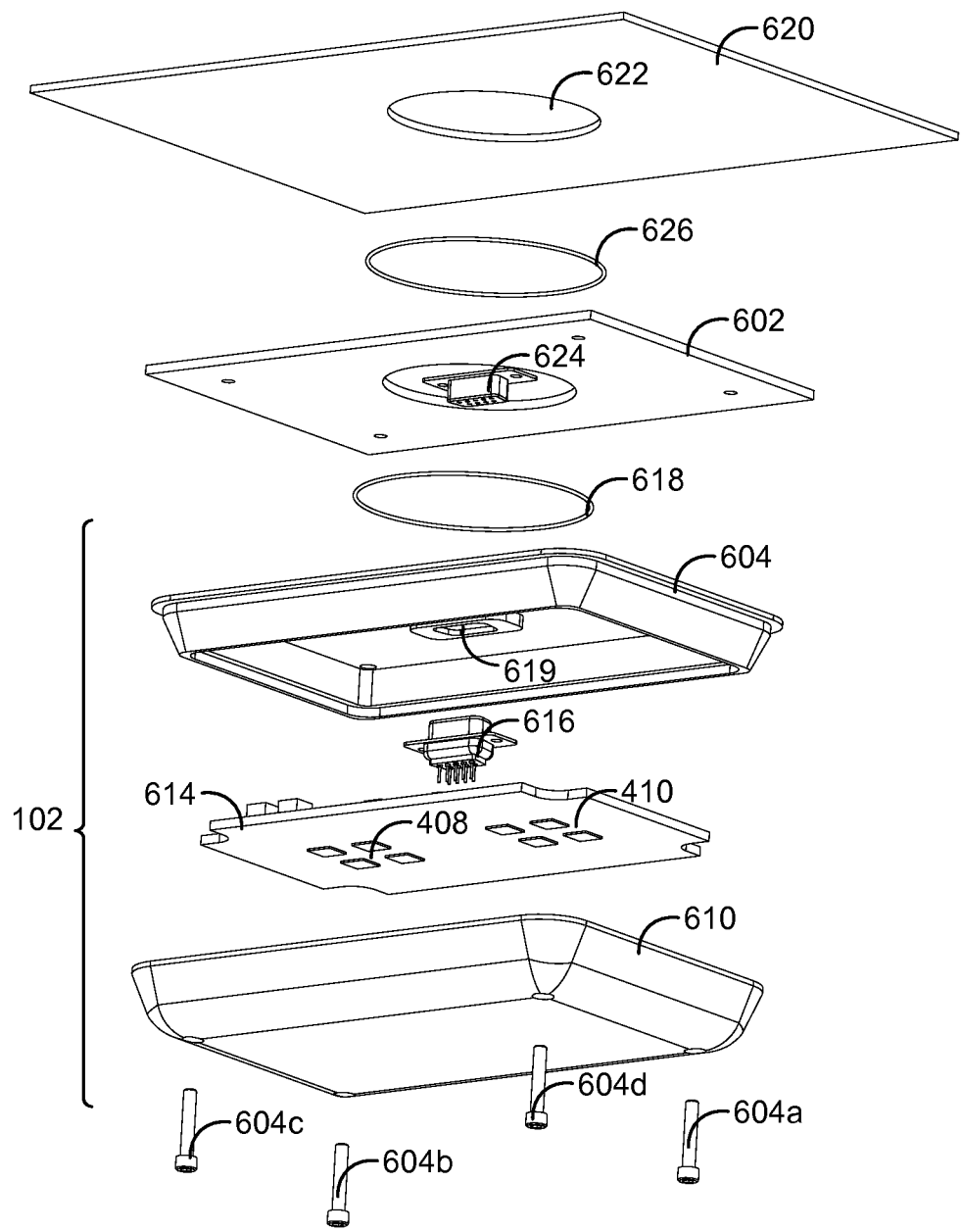
FIG. 6E is an exploded perspective view schematic drawing of the smart antenna of FIG. 1 connected to a base plate and a fuselage of the aircraft of FIG. 1 according to exemplary aspects of the inventive concepts disclosed herein.

With reference of FIG. 6E, smart antenna 102 is shown to be connected to fuselage 620 via mounting plate 602. Mounting plate 602 may be permanently and/or temporarily connected to fuselage 620. In some embodiments, an adhesive is used between mounting plate 602 and fuselage 620 and not between the outer layer of chassis 612 and fuselage 620. This may create a pressure seal for aircraft 100 but allow for smart antenna 102 to be quickly and easily, accessed, removed, or replaced without breaking the pressure seal. In some embodiments, adhesive is used between the outer layer of chassis 612 and mounting plate 602. Mounting plate 602 is shown to be connected to fuselage 620 with o-ring 626 in between. O-ring 626 may be the same and/or similar to o-ring 618. O-ring 626 may be a plastic, rubber, or other type of material that forms a pressure seal. O-ring 626 may be in direct contact with mounting plate 602 and fuselage 620. In FIG. 6E, o-ring 618 may be in physical contact with chassis 612 and mounting plate 602 forming a pressure seal between chassis 612 and mounting plate 602. Male connector 616 may connect with female connector 624. This may electrically connect smart antenna 102 with various systems of aircraft 100. Any cables or wires connected to female connector 624 may pass through fuselage opening 622 and o-ring 626. Further, male connector 616 and/or female connector 624 may connect through o-ring 618 and opening 619 of chassis 612.

Mounting hardware 604a-d can hold smart antenna 102 to mounting plate 602. Since mounting hardware 604a-d holds smart antenna 102 to mounting plate 602, a technician can remove smart antenna 102 and easily replace smart antenna 102 by removing mounting hardware 604a-d and removing smart antenna 102. Even when smart antenna 102 is removed from mounting plate 602, the pressure seal between mounting plate 602 and fuselage 620 may not be broken. This allows a technician to remove and/or replace smart antenna 102 without having to worry about breaking a pressure seal between smart antenna 102 and aircraft 100.

Figure 6F:
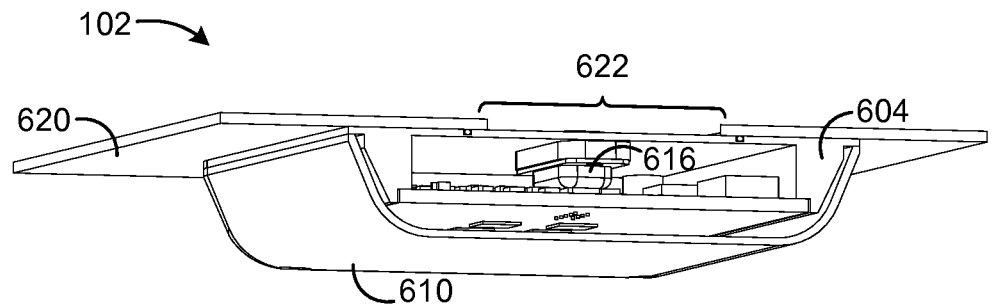
FIG. 6F is a perspective view schematic drawing of the smart antenna of FIG. 1 connected to a fuselage of the aircraft of FIG. 1 according to exemplary aspects of the inventive concepts disclosed herein.

With reference to FIG. 6F, smart antenna 102 is shown to be connected to fuselage 620 of aircraft 100. As can be seen in FIG. 6F, male connector 616 is exposed through fuselage opening 622. This may allow for connections to be made with circuit board 614. Although not shown, o-ring 618 can be located between chassis 612 and fuselage 620. This may create a pressure seal between smart antenna 102 and aircraft 100 even though fuselage 620 includes opening 622.

Figure 6G:
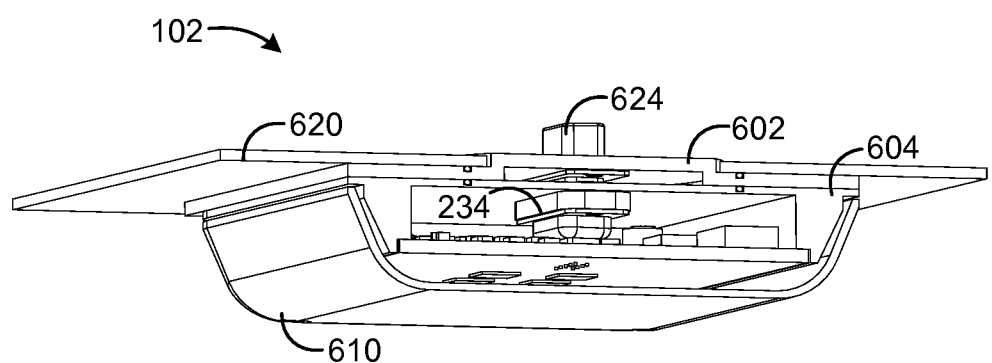
FIG. 6G is a perspective view schematic drawing of the smart antenna of FIG. 1 connected to a base plate and the aircraft of FIG. 1 according to exemplary aspects of the inventive concepts disclosed herein.

With reference to FIG. 6G, smart antenna 102 is shown to be connected to fuselage 620 of aircraft 100 via mounting plate 602. As can be seen, chassis 612 is connected to mounting plate 602 while mounting plate 602 is connected to fuselage 620. O-ring 618, although not shown, can create a pressure seal between chassis 612 and mounting plate 602 while o-ring 626, although not shown, can create a pressure seal between mounting plate 602 and fuselage 620. Since smart antenna 102 is connected to fuselage 620 via mounting plate 602, smart antenna 102 can easily be removed or replaced without breaking a pressure seal since the pressure seal exits between mounting plate 602 and fuselage 620.

Figure 8:
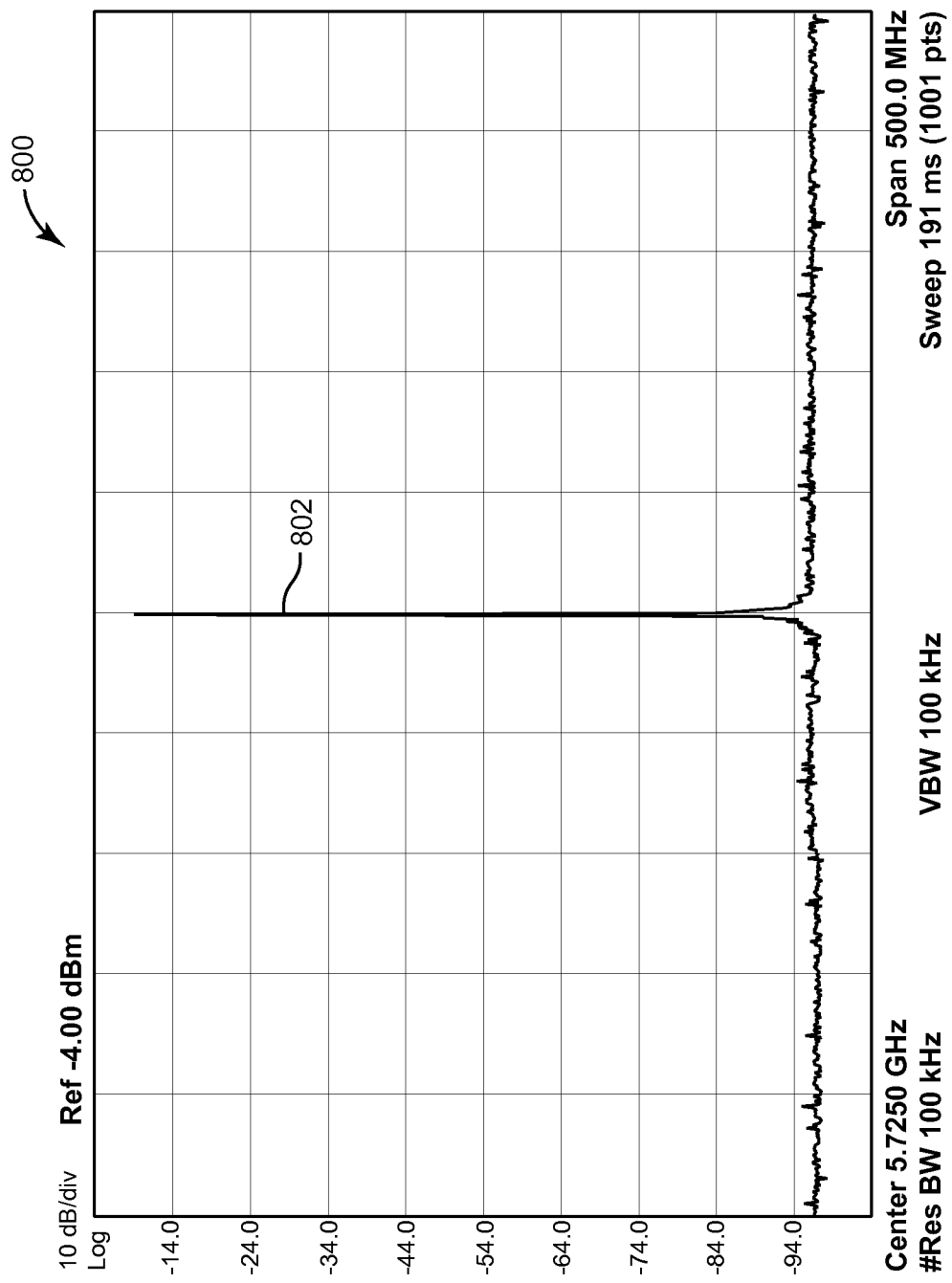
FIG. 8 is a graph illustrating the performance of the altimeter circuit of FIG. 4 according to exemplary aspects of the inventive concepts disclosed herein.

With reference to FIG. 7, a graph 700 illustrates the spurious response of LRA circuit 300 is shown. Graph 700 shows that the signal generated by LRA circuit 300 has a main frequency component at 4.36993 GHz at marker 702 with a magnitude of 26.09 dBm. The main frequency component 702 may be the desired frequency for transmitted signal 104 (e.g., a frequency linearly ramped between 4225 MHz and 4375 MHz). Prominent spurious signals 704 at −49.43 dBm, 706 at −48.79 dBm, and 708 at −59.52 dBm are undesired frequency components of transmitted signal 104. Spurious signal 704 (is shown to be 15.98 MHz above the main frequency 702 while harmonic 706 is shown to be −15.98 MHz below the fundamental frequency 702 and harmonic 708 is shown to be −38.46 MHz below the main frequency component 702. With reference to FIG. 8, graph 800 of the spurious response of LRA circuit 400 is shown. Graph 800 indicates that there are no prominent spurious signals and only the main frequency component marked by 802 is included in transmitted signal 104. In comparison, LRA circuit 400 generates a cleaner signal that LRA circuit 300, i.e., a signal with less (or no) significant harmonic components.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. An altimeter apparatus for external fuselage mounting for an aircraft, wherein the altimeter apparatus comprises:
    an altimeter circuit coupled to an antenna system, wherein the altimeter circuit is configured to:
        generate a first signal and transmit the first signal via the antenna system;
        receive a second signal via the antenna system, wherein the second signal is a reflected version of the first signal; and
        determine an altitude based on the first signal and the second signal; and
    a chassis configured to contain the altimeter circuit and the antenna system outside the aircraft, wherein the chassis is connected to an external side of the fuselage of the aircraft and is located outside of the aircraft.

2. The altimeter apparatus of claim 1, further comprising a radome cover connected to the chassis structured to enclose the altimeter circuit and the antenna system.

3. The altimeter apparatus of claim 1, further comprising a first o-ring that forms a pressure seal between the chassis and the fuselage of the aircraft.

4. The altimeter apparatus of claim 1, wherein the chassis is connected to a mounting plate that is connected to the fuselage of the aircraft, wherein the altimeter apparatus further comprises a first o-ring that forms a first pressure seal between the chassis and the mounting plate and a second o-ring that forms a second pressure seal between the mounting plate and the fuselage of the aircraft.

5. The altimeter apparatus of claim 4, wherein the chassis and a radome cover contain the altimeter circuit and the antenna system and can be removed from the mounting plate without breaking a pressure seal of the aircraft.

6. The altimeter apparatus of claim 1, further comprising a connector configured to provide electrical connections between the altimeter circuit and the aircraft, wherein the electrical connections comprise communication connections; and
    wherein the altimeter circuit is configured to communicate altitude information to the aircraft via the communication connections based on the altitude.

7. The altimeter apparatus of claim 1, further comprising a first connector and a mounting plate;
wherein the mounting plate comprises a second connector structured to connect with the first connector, wherein the first connector and the second connector are configured to provide electrical connections between the aircraft and the altimeter circuit.

8. The altimeter apparatus of claim 1, wherein the altimeter circuit comprises a fractional-N synthesizer, wherein the altimeter circuit is configured to generate the first signal via the fractional-N synthesizer, wherein the first signal is a frequency modulated continuous wave (FMCW) signal, wherein based on the fractional-N synthesizer, a size of the altimeter circuit is such that the altimeter circuit can be located outside the aircraft.

9. The altimeter apparatus of claim 1, wherein the altimeter circuit comprises a fractional-N synthesizer, wherein the altimeter circuit is configured to:
generate, via the fractional-N synthesizer, the first signal with a frequency in a super high frequency (SHF) band; and
ramp the frequency of the first signal within an upper limit and a lower limit of a predefined frequency range, wherein the upper limit of the predefined frequency range is 4400 MHz and the lower limit of the predefined frequency range is 4200 MHz.

10. The altimeter apparatus of claim 1, wherein the antenna system comprises a first antenna and a second antenna, wherein the first antenna and the second antenna are both patch array antennas each comprising four patch antennas.

11. An altimeter system for external fuselage mounting for an aircraft, wherein the altimeter system comprises:
an altimeter circuit coupled to a first antenna and a second antenna, wherein the altimeter circuit is configured to:
generate, via a fractional-N synthesizer, a first signal and transmit the first signal via the first antenna;
receive a second signal via the second antenna, wherein the second signal is a reflected version of the first signal; and
determine an altitude based on the first signal and the second signal; and
a chassis configured to contain the altimeter circuit, the first antenna, and the second antenna outside the aircraft, wherein the chassis is connected to a mounting plate of the aircraft on an external side of a fuselage of the aircraft and is located outside of the aircraft; and
a radome cover connected to the chassis, wherein the radome cover is structured to enclose the altimeter circuit, the first antenna, and the second antenna.

12. The altimeter system of claim 11, further comprising a first o-ring that forms a first pressure seal between the chassis and the mounting plate and a second o-ring that forms a second pressure seal between the mounting plate and the fuselage of the aircraft.

13. The altimeter system of claim 11, further comprising a connector configured to provide electrical connections between the altimeter circuit and the aircraft, wherein the electrical connections comprises communication connections; and
wherein the altimeter circuit is configured to communicate altitude information to the aircraft via the communication connections based on the altitude.

14. The altimeter system of claim 11, further comprising a first connector; and
wherein the mounting plate comprises a second connector structured to connect to the first connector of the altimeter system and provide electrical connections between the aircraft and the altimeter circuit.

15. The altimeter system of claim 11, wherein the first signal generated via the fractional-N synthesizer is a frequency modulated continuous wave (FMCW) signal, wherein based on the fractional-N synthesizer, a size of the altimeter circuit is such that the altimeter circuit can be located outside the aircraft.

16. The altimeter system of claim 11, wherein the first antenna and the second antenna are each patch array antennas each comprising four patch antennas.

17. A low range altimeter (LRA) apparatus for external fuselage mounting on an aircraft, wherein the LRA apparatus comprises:
an altimeter circuit coupled to a first antenna and a second antenna, wherein the altimeter circuit is configured to:
generate a first signal and transmit the first signal via the first antenna;
receive a second signal via the second antenna, wherein the second signal is a reflected version of the first signal; and
determine an altitude based on the first signal and the second signal; and
a chassis configured to contain the altimeter circuit, the first antenna, and the second antenna outside the aircraft, wherein the chassis is connected to an external side of the fuselage of the aircraft and is located outside of the aircraft;
wherein the chassis is connected to a mounting plate that is connected to the fuselage of the aircraft, wherein a first o-ring forms a first pressure seal between the chassis and the mounting plate and a second o-ring forms a second pressure seal between the mounting plate and the fuselage of the aircraft.

18. The LRA apparatus of claim 17, further comprising a connector configured to provide electrical connections between the altimeter circuit and the aircraft, wherein the electrical connections comprise communication connections; and
wherein the altimeter circuit is configured to communicate altitude information to the aircraft via the electrical connections based on the altitude.

19. The LRA apparatus of claim 17, further comprising a first connector;
wherein the mounting plate comprises a second connector structured to connect to the first connector of the LRA apparatus, wherein the first connector and the second connector are configured to facilitate electrical connections between the aircraft and the altimeter circuit.

20. The LRA apparatus of claim 17, wherein the altimeter circuit comprises a fractional-N synthesizer, wherein the altimeter circuit is configured to generate, via the fractional-N synthesizer, the first signal, wherein the first signal generated via the fractional-N synthesizer is a frequency modulated continuous wave (FMCW), wherein based on the fractional-N synthesizer, a size of the altimeter circuit is such that the altimeter circuit can be located outside the aircraft.

* * * * *